(12) United States Patent
Hinkle

(10) Patent No.: US 9,707,599 B2
(45) Date of Patent: Jul. 18, 2017

(54) METHOD AND APPARATUS FOR PALLET JACK CLEANING AND SANITIZING

(71) Applicant: Michael K. Hinkle, Chambersburg, PA (US)

(72) Inventor: Michael K. Hinkle, Mechanicsburg, PA (US)

(73) Assignee: Alex C. Fergusson, LLC, Chambersburg, PA (US)

( * ) Notice: Subject to any disclaimer, the term of this patent is extended or adjusted under 35 U.S.C. 154(b) by 368 days.

(21) Appl. No.: 14/194,102

(22) Filed: Feb. 28, 2014

(65) Prior Publication Data
US 2015/0246375 A1    Sep. 3, 2015

(51) Int. Cl.
*B08B 3/02* (2006.01)
*B60S 3/04* (2006.01)
*B08B 17/02* (2006.01)

(52) U.S. Cl.
CPC ............. *B08B 3/024* (2013.01); *B08B 3/02* (2013.01); *B08B 17/025* (2013.01); *B60S 3/04* (2013.01)

(58) Field of Classification Search
None
See application file for complete search history.

(56) References Cited

U.S. PATENT DOCUMENTS

| | | | | |
|---|---|---|---|---|
| 4,957,126 A * | 9/1990 | Allaeys | ..................... | B60S 3/04 134/123 |
| 5,291,906 A * | 3/1994 | White | ....................... | B60S 3/04 134/123 |
| 5,730,164 A * | 3/1998 | Midkiff | ................... | B60S 3/042 134/104.2 |
| 6,120,614 A | 9/2000 | Damron | | |
| 2005/0132511 A1* | 6/2005 | Berg | ....................... | B66F 7/243 14/69.5 |
| 2011/0253175 A1* | 10/2011 | Petter | .................... | B08B 17/025 134/18 |
| 2013/0291906 A1* | 11/2013 | Belanger | ................ | B60S 3/042 134/123 |
| 2015/0059812 A1* | 3/2015 | Petter | ....................... | B60S 3/04 134/123 |

FOREIGN PATENT DOCUMENTS

KR        WO9935916 A3    9/1999

* cited by examiner

*Primary Examiner* — Micahel Barr
*Assistant Examiner* — Cristi Tate-Sims
(74) *Attorney, Agent, or Firm* — Miller & Martin, PLLC

(57) ABSTRACT

A pallet jack washing apparatus for washing the forks of a pallet jack comprising an enclosure having an entrance end and one or more openings in the entrance end with a substantially open track for carrying the wheels of the pallet jack forks traversing within the enclosure from said opening. A spray apparatus surrounds the track, said spray apparatus having a plurality of spray heads for directing washing fluids towards the track from substantially all angles. The spray apparatus may be affixed within the enclosure or may be configured to travel lengthwise axially along the track to apply washing fluids to the forks, wheel mounts and front wheels of a pallet jack. The spray apparatus is connected through a cleaning fluid circuit to one or more sources of washing fluid. The method of using a pallet jack washing apparatus to wash, rinse and sanitize a pallet jack.

20 Claims, 6 Drawing Sheets

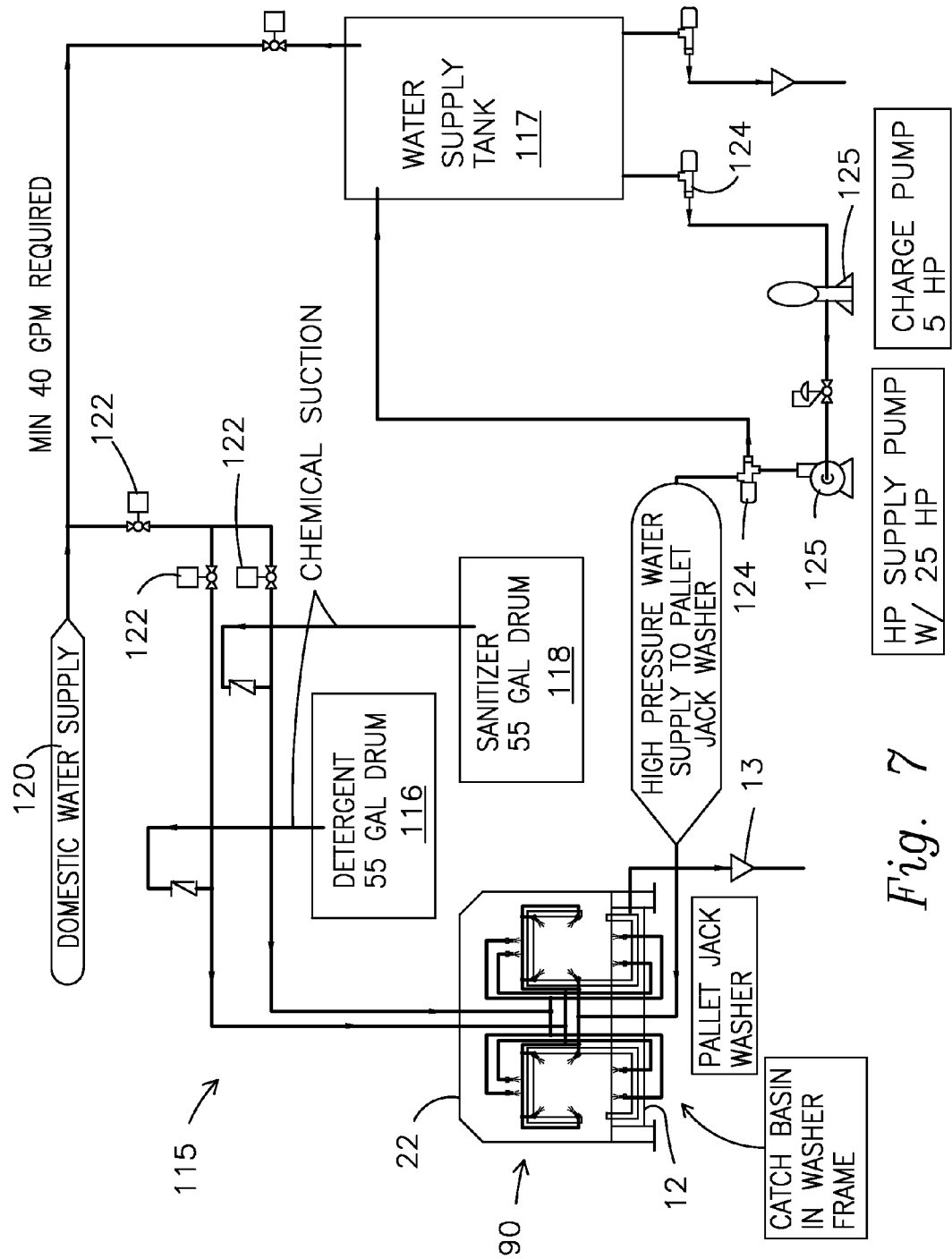

METHOD AND APPARATUS FOR PALLET JACK CLEANING AND SANITIZING

BACKGROUND OF THE INVENTION

The present invention relates to an apparatus to be used in conjunction with material handling, particularly within environments where it is important to control potential sources of contamination. The present invention is directed to preventing and controlling contaminants associated with material handling equipment, specifically pallet jacks or other forked, load bearing devices. The underside of a pallet jack has been shown to provide harborage points for bacteria. The design of the pallet jack makes it extremely difficult to effectively clean and sanitize the underside of the pallet jack manually.

The present invention also relates to a system for removing contaminants from a pallet jack, and, more particularly, to a system (apparatus and method) for delivering cleaning liquids or fluids, such as water, liquid chemical detergents and sanitizing agents, under pressure to the surfaces of a pallet jack through an applicator, such as a spray cabinet or enclosure configured for vigorously spraying or applying the fluids to all of the surfaces of the pallet jack.

This invention has particular application to facilities processing fresh meat products, including but not limited to poultry, beef, and pork, which are susceptible to contamination by microorganisms immediately after the animal has been slaughtered and eviscerated. United States Department of Agriculture (USDA) and Food and Drug Administration (FDA) regulations require that steps be taken to eliminate or at least minimize this contamination.

As part of the manufacturing process, raw materials are transported into and out of different areas of the manufacturing facility, such as food processing areas and other parts of the facility where it is desirable, and indeed mandated by regulation, to maintain a clean working environment. To facilitate transport, materials are typically placed on pallets. Palletized loads are often moved by a worker using material handling equipment such as manual or powered pallet jacks. A pallet jack, also known as a pallet truck, pallet pump, pump truck, jigger, or simply, a truck or jack, is a tool used to lift and move pallets. A manually operated pallet jack consists of two forks and a steering unit. The forks are entered into the pallet which is raised by a hand-operated hydraulic pump until the load is clear of the ground. Because of the relatively small wheels required for entry into the pallet, the floor needs to be smooth and fairly level. Electric or gas powered pallet jacks similar to the hand pallet jacks can be pedestrian-operated or rider-operated depending on design. Powered pallet jacks are quicker in operation than hand pallet jacks and are more suited to greater loads and distances and traversing relatively uneven surfaces and inclines. Powered pallet jacks are typically longer from the rear of the forks to the back of the jack due to the greater space required for the motor and, for rider-operated pallet jacks, a platform or seating. A simple modification is frequently made to pallet jacks by means of a frame fitted over the forks making it suitable for transport of loads other than pallets, such as boxes, bins, or other types of containers.

In order to maintain the integrity of the environment in a food processing facility, it is, therefore, necessary to clean the pallet jacks or other material handline equipment on a regular basis. Because of their awkward shape, long and low to the ground, and the continuing need for constant repetitive cleaning, cleaning pallet jacks can be very challenging, cumbersome, time consuming, and expensive.

Currently, the most effective method for cleaning this machinery, such as pallet jacks, is through manual wipe down. This method is ineffective for cleaning the bottom of the pallet jack due to the physical constraints of manual wipe down. It is difficult, especially with a low pallet jack, to wash the complete underside of the pallet jack in a completely satisfactory manner using a manual method.

There is a need for an effective, fast-operating cleaning arrangement for removing contaminants from pallets jacks, especially the underside of the forks. The objective of the present invention is to provide a novel method and apparatus for washing the forks of pallet jacks.

BRIEF SUMMARY OF THE INVENTION

The present invention relates to an automatic washing apparatus and a method for using such apparatus. Specifically, the food industry requires sanitary design for equipment, meaning the a device does not have any harborage points and can be cleaned easily. The pallet jack washing apparatus of the present inventions meets sanitary design requirements, making it suitable for use in a food manufacturing facility.

Among the several objects of this invention may be noted the provision of an apparatus for and method of mixing and delivering washing liquid, such as chemical detergent and/or sanitizing agents, to a system for applying the liquids to a pallet jack; the provision of such a delivery apparatus and method which deliver a liquid to the applicator system at a uniform rate; the provision of such a delivery apparatus and method which is easy to operate and maintain; the provision of an improved applicator apparatus which includes a spray cabinet with a programmable logic controller, thereby maximizing the effectiveness of the liquid to kill bacteria on the surfaces of the pallet jack; the provision of such a spray cabinet which is effective for contacting all exterior surfaces of the pallet jack, including the underside of the pallet jack which is normally difficult to access; the provision of such a spray cabinet which effectively contains spray within the cabinet and inhibits the escape of spray from the cabinet; and the provision of such a spray cabinet in which contaminated liquid exits the cabinet into a catch basin or an open pit below the cabinet to facilitate disposal.

This spray cabinet system comprises a substantially impermeable waterproof cabinet having first and second opposing sides, front and rear opposing ends, and a top and a bottom defining a spray chamber, said cabinet having an entry at one end of the cabinet for insertion of the fork portions of the pallet jack into the spray chamber. A spray system is provided inside the spray chamber for spraying liquid chemical onto the forks of the pallet jack that are inserted into the cabinet. The entry can be modified, manually or by a sensor, and is sized not substantially larger than necessary to accommodate said fork portion of the pallet jack so as to inhibit the escape of spray from the spray chamber. One or more drains are provided in the bottom of the cabinet for draining liquid from the cabinet.

The spray cabinet system comprises a cabinet or enclosure having opposing sides, a top and a bottom defining a spray chamber. The spray cabinet includes a spray system inside the spray chamber for spraying liquid chemical onto the surfaces of a pallet jack after it is inserted into the cabinet. The spray system comprises a plurality of low-volume spray nozzles, each configured for spraying said liquid chemical at low, medium, or high pressures, for example, at a rate of about 0.1-10.0 gallons per minute ("gpm"), said spray nozzles being located throughout the spray chamber for continuously exposing the various surfaces of the pallet jack to said liquid chemical. The same spray system may then be used to rinse and sanitize the pallet jack forks.

Generally described, without restriction on the scope of the invention as contained in the appended claims, one preferred embodiment of the present invention comprises a housing arrangement employing a pair of spray bars, comprised of columnar-like side housing members having a substantially horizontal top and bottom housing there across providing a spray support arrangement through which the fork portion of the pallet jack is inserted. Each of the housings has at least one or more ports or openings formed therein through which protrudes a spray nozzle having one or a plurality of apertures therein arranged to spray in a fan-shaped spray pattern onto all sides of the forks. The distance between the nozzles and the forks as well as the spray pattern configurations are selected in such a manner as to ensure that at the point of contact with each of the surfaces of the pallet jack forks, the sprays overlap sufficiently to substantially cover and wash the entire surface. The nozzles are attached by pipe fittings, plumbing, or other suitable means to selectively receive water or the desired cleanser, disinfectant solution, or sanitizer through the vertical fluid pipe, which in turn is operatively connected receive fluid from a main water supply or one or more reservoirs for cleaning solutions. Each spray bar is moveable within the spray cabinet, with such movement effected by air or hydraulic fluid actuators and controlled via connection to manual or automatic operating means, such as an electronic control panel or manual lever system.

Still another aspect of this invention involves an automated system for cleaning pallet jacks inserted into the cabinet. A sensor positioned inside the cabinet monitors the position of the top of the cabinet (washer cover) and generates a signal representative of the closing of said washer cover to enclose the cabinet. A controller receiving the washer cover position signal indicating that the washer cover is closed controls the system to initiate the cleaning process. Said controller may also involve an electronic control panel with operator interface to enable a variety of programmable logic controllers, timers, safety switches, sensors, relays, and push buttons that provide for customization of the washing and sanitation processes.

Among the additional objects of this invention may be noted the provision of a system for controlling and monitoring the application of liquid to the pallet jack and for recording and reporting data corresponding to various conditions and/or parameters of the cleaning process, such as time, chemical strength, temperature, sanitizing strength, and the identity of the operator and pallet jack.

BRIEF DESCRIPTION OF THE DRAWINGS

The particular features and advantages of the invention as well as other objects will become apparent from the following description taken in connection with the accompanying drawings in which:

FIG. 7 is a schematic flow chart for plumbing for one embodiment the present invention.

DETAILED DESCRIPTION OF THE INVENTION

Figure 1:
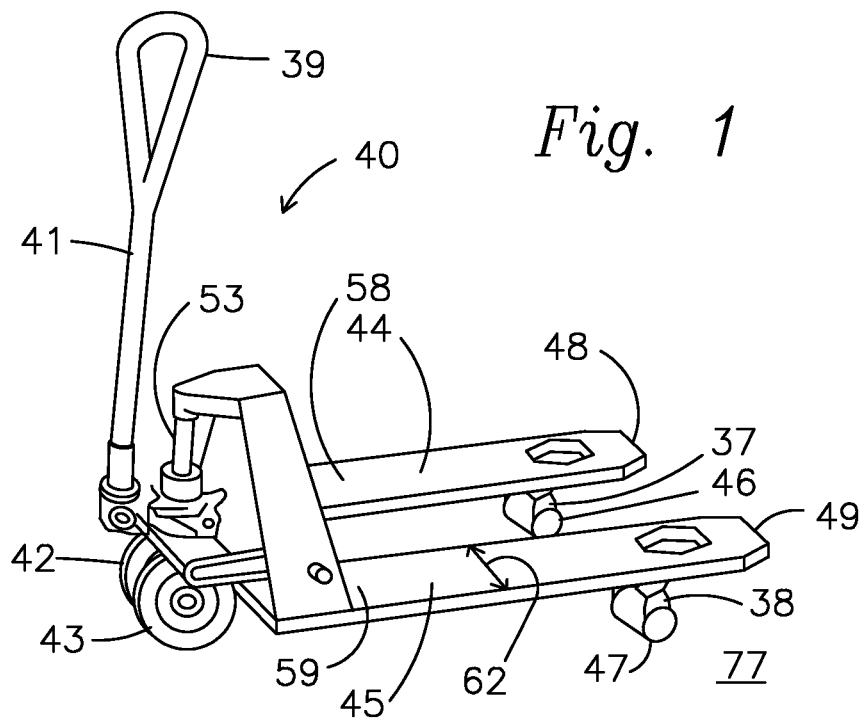
FIG. 1 is a perspective view of a manual pallet jack.
Figure 2:
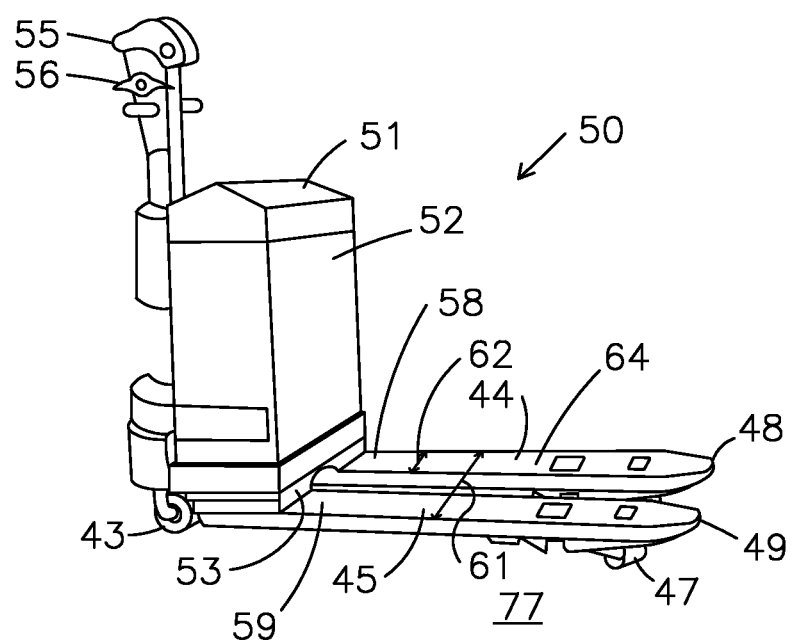
FIG. 2 is a perspective view of a powered pallet jack.

FIGS. 1 and 2 show typical pallet jacks 40 and 50. FIG. 1 shows a manual pallet jack 40 and FIG. 2 shows a typical example of a powered pallet jack 50. Both types of pallet jacks 40, 50 have rear wheels 42, 43 and a pair of left-side and right-side parallel forks 44, 45, each fork 44, 45 being supported by an associated front wheel 46, 47. The front wheels 46, 47 are attached to a hinged mount 37, 38 inside the front end 48, 49 of the forks 44, 45, and as the hydraulic jack 53 is raised, the forks 44, 45 are separated vertically from the front wheels 46, 47, forcing the load or pallet (not shown) upward until it clears the floor 77. The pallet is only lifted enough to clear the floor 77 for subsequent travel.

As seen in FIG. 1, manually operated pallet jack 40 has a steering unit 41, which also functions as a lever for operating the hydraulic jack 53. A user holds the handle 39 of the steering unit 41 and either pushes or pulls the manual pallet jack 40.

Powered pallet jacks 50 (shown in FIG. 2), also known as electric pallet trucks, walkies, and single or double pallet jacks, and are motorized to allow lifting and moving of heavier loads and stacked pallets. A powered pallet jack 50 has a motor (not shown) enclosed in a housing 51 and is operated from a control unit or handle 55. The powered pallet jack 50 is generally moved by a throttle 56 on the handle 55 to move forward or in reverse and steered by swinging the handle 55 in the intended direction. Some powered pallet jacks 50 further comprise a platform (not shown) upon which the user stands while moving pallets.

As illustrated in FIG. 2, the front 52 of the housing 51 is oriented vertically or even inclined away from the back end 58, 59 of the forks 44, 45 so that it provides a surface, lower edge or other stopping structure against which the pallet or palletized load (not shown) will engage so that the user knows that the forks 44, 45 are fully inserted into the pallet (not shown).

In North America, pallet jacks 40, 50 have become somewhat standardized, though, of course, the present invention may be manufactured with dimensions appropriate to accommodate pallet jacks of non-standard size. In standard pallet jacks 40, 50, the upper surface 64 of each of the forks 44, 45 are about 7 inches (about 17.8 cm) in width 62, and the dimension commonly referred to in the industry as the "fork width" 61, i.e., the dimension between the outer edges of the forks 44, 45, are generally made in either 20¼" (about 51.4 cm) or 27" (about 68.6 cm) sizes. The standard lengths of forks 44, 45 of pallet jacks 40, 50 are about 36 inches (about 91.4 cm), about 42 inches (about 106.7 cm), and about 48 inches (about 121.9 cm) from the front end 48, 49 of fork 44, 45 to the back end 58, 59 of the fork 44, 45. When lowered, the standard height of the forks 44, 45 from the floor 77 is about 2.9 inches (about 7.4 cm), and the typical maximum raised height of the forks 44, 45 from the floor 77 is only about 7.5 inches (about 19.1 cm), though some models do lift the forks 44, 45 higher.

Figure 3:
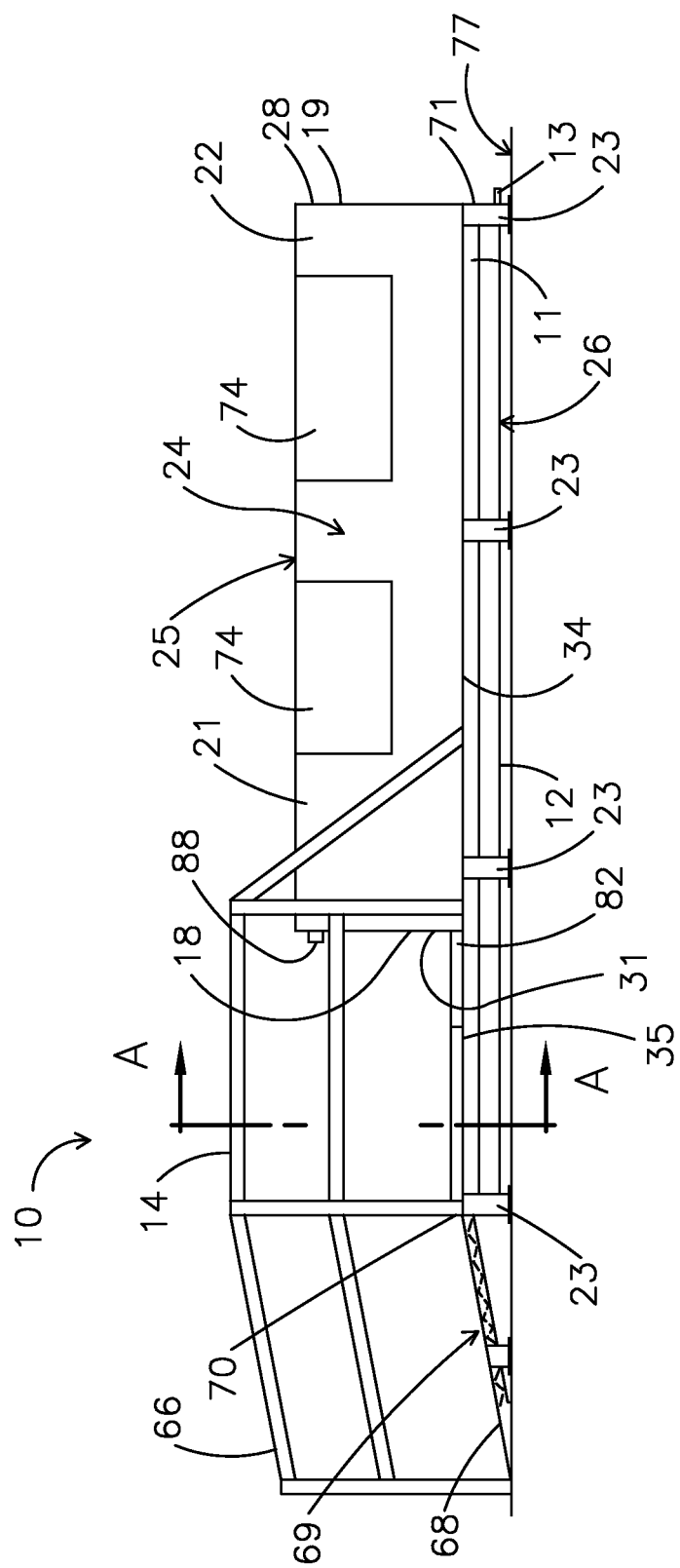
FIG. 3 is a side view of a pallet jack washer apparatus according to the present invention.

FIG. 3 is a side view of one embodiment of a pallet jack washing apparatus 10 according to the present invention. Pallet washing apparatus 10 comprises a base, such as base frame 11, a reservoir, such as catch basin 12, and a pair of substantially parallel sides, such as wall frames or rails 14 (parallel rail not shown in FIG. 3; see rail 15 in FIG. 4).

A means for substantially containing sprayed fluids, such as an enclosure or wash cabinet 22 is carried upon base frame 11. Enclosure has a closed end 28 and an opposing entrance end 31. The closed end 28 of the enclosure 22 is located substantially at one of the opposing ends 70, 71 of the base frame 11, and the entrance end 31 is disposed across the base frame 11 between the opposing ends 70, 71, thus, the enclosure 22 surrounds, encloses or is attached about a first portion 34 of the base frame 11, and leaves a second portion 35 of the base frame 11 outside of the enclosure 22. The entrance end 31 of the enclosure 22 has one or more openings (not shown in FIG. 1), said opening or openings providing access to the interior 24 of the enclosure 22 through which the forks 44, 45 of a pallet jack (not shown) may be inserted. The interior 24 of the enclosure 22 may be referred to herein as the spray cabinet. Wall frames 14 or rails extend upward from the base frame 11 on opposing sides of the second, unenclosed portion 35 of the base frame 11 and extend along the sides of the base frame 11 substantially from the entrance end 31 of the enclosure to the opposing end 70 of the base frame 11. Rails 14 may also extend along opposing sides of the ramp 68 as ramp rails 66 (parallel ramp rail not shown in FIG. 3; see 67 in FIG. 4).

The shape of the substantially impermeable or waterproof outer hull of the enclosure 22 may vary significantly. In the embodiment shown in FIG. 3, the enclosure 22 comprises a plurality of walls, such as front wall 18 (entrance end 31), rear wall 19 (closed end 28), left side wall 20 (not shown in FIG. 3), right side wall 21, a top 25 and a bottom 26, each wall 18, 19, 20, 21 adjoined on the upper side by the top 25 and adjoined on the lower side by the bottom 26. Walls 18, 19, 20, 21 are affixed to base frame 11, thereby forming a rectangular enclosure 22 into which the forks 44, 45 of a pallet jack 40, 50 or other similar lifting apparatus (not shown) are inserted and substantially surrounded during operation of the pallet jack washing apparatus 10.

The bottom 26 of the enclosure 22 may comprise a catch basin 12 having a drain 13 to allow for fluids to be removed during or after the wash cycle. The floor or bottom 26 of the catch basin 12 may be sloped towards one or more drains 13 to assist in water removal. In a preferred embodiment, catch basin 12 extends beyond the enclosure 22 and first portion 34 of base frame 11, and runs underneath the second portion 35 of the base frame 11 as shown in FIG. 3. In an alternate embodiment, the bottom 26 of the enclosure 22 may comprise a separate structure such as a pit, sump or other drainage system (not shown) configured to releasably capture water and other fluids generated during washing so that contaminants cleaned from the pallet jack 40, 50 may be contained and adequately disposed of without further contamination of the floor 77 of the facility. This alternative would only replace the ramp 68 and posts 23 needed to elevate the base frame 11, but not the any of the working mechanisms or controls to clean and sanitize a pallet jack 40, 50.

In order to provide access to working parts housed within the enclosure 22, the outer hull of the enclosure 22 preferably further comprises one or more access panels or hinged cover members 74.

In a preferred embodiment, base frame 11 is elevated to allow sufficient room for the attachment of catch basin 12 below the base frame 11 so that washing fluid will drain due to the force of gravity into catch basin 12. Enclosures 22 without an attached bottom 26 but that rest upon or otherwise integrate with a separate drainage system or depression built into the floor 77 of the facility (not shown) are within the contemplation of the present invention. In the preferred embodiment, a plurality of posts or legs 23 attached about the base frame 11 elevate the base frame 11 a suitable distance above the floor 77. Although posts 23 may be of any suitable size, in the preferred embodiment, posts 23 are about 9.5 inches (about 24 cm) tall, so that the catch basin 12 may be suspended and supported below the base frame 11 and still be a sufficient distance off of the floor 77 to allow drainage through drain 13 at the bottom of or below the catch basin 12.

Figure 4:
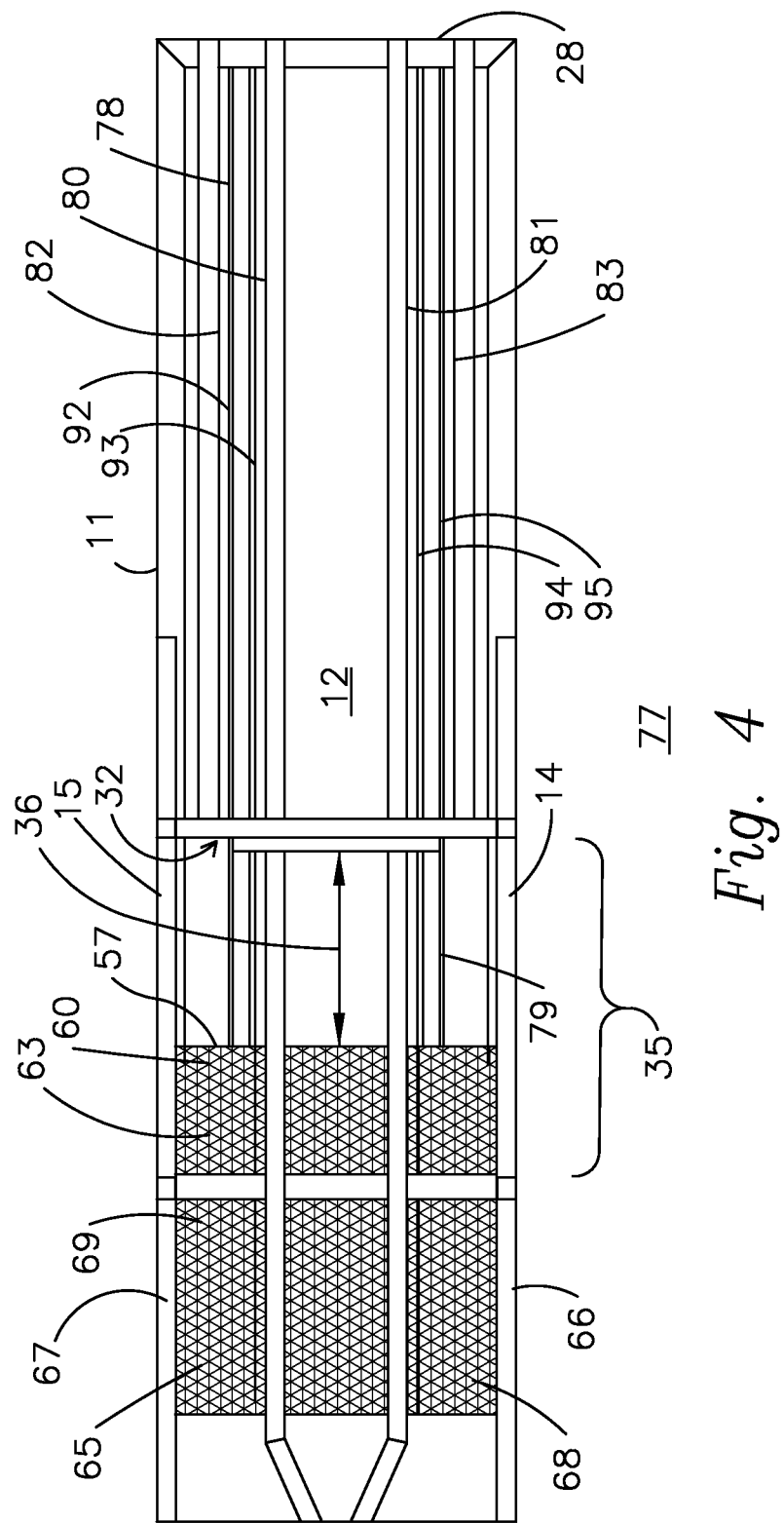
FIG. 4 is a top view of the base frame, tracks, guides and rails of a preferred embodiment of the pallet jack washer apparatus of the present invention shown without the enclosure.

As shown in FIG. 4, a ramp 68 is attached, such as by bolts or hinges (not shown), to the second portion 35 of the base frame 11 opposite the entrance end 32 of enclosure 22, thereby providing a surface 69, such as grate 65, which is inclined at about 10 degrees relative to the floor 77, to allow a pallet jack 40, 50 to be wheeled onto another floor portion 63, such as grating 60, disposed on the base frame 11 between the wall frames 14, 15. Ramp rails 66, 67 may be disposed on either side of the ramp 68 for safety and to provide additional guidance for the pallet jack 40, 50 as it is wheeled onto the pallet jack washing apparatus 10. In a preferred embodiment, both the surface 69 of ramp 68 and the grating 60 comprise a non-skid fiber grating to both provide traction for the wheels of the pallet jacks 40, 50 and to allow liquids to pass through. It should be appreciated that ramp 68 and grating 60 may generally take many other suitable forms.

In an alternate embodiment not shown in FIG. 3 or 4, the floor portion 60 may extend within the enclosure 22, such as with additional grating disposed between the left and right walls 20, 21 of the enclosure 22. However, in a preferred embodiment shown in FIG. 4, the floor portion 63 does not completely cover the second portion 35 of the base frame 11, rather, floor portion 63 ends before the entrance end 32 of the enclosure 22, leaving a subportion 36 of the second portion 35 open and uncovered above the catch basin 12 between the inner edge of floor portion 63 and the entrance end 32 of the enclosure 22. This subportion 36 is spanned by a pair of parallel tracks 78, 79 extending from the floor portion 63 through the entrance end 32 of the enclosure 22, and from the entrance end 22 the tracks 78, 79 traverse into the enclosure 22, preferably substantially to the closed end 28 of the enclosure 22. Tracks 78, 79 are elevated 22 from the bottom 26 of the enclosure 22 and serve to carry and properly position the front wheels 46, 47 and forks 44, 45 of a pallet jack 40, 50 within the spray cabinet 24 of the enclosure 22.

In the preferred embodiment illustrated in FIG. 4, each of tracks 78, 79 comprise a pair of relatively thin runners 92, 93, 94, 95 which support the front wheels 46, 47. The use of thin runners 92, 93, 94, 95 minimizes the surface area of the wheel 46, 47 that is in contact with the runners 92, 93, 94, 95, thereby maximizing the ability to effectively clean and sanitize the wheel 46, 47. Tracks 78, 79 further comprise a one or more upright guides, such as angle irons 80, 81, 82, 83 disposed on either side of runners 92, 93, 94, 95 to assist in keeping the wheels 46, 47 relatively centered atop the runners 92, 93, 94, 95. Thus it can be seen that tracks 78, 79 comprise a substantially open structure that will support the wheels 46, 47 and forks 44, 45 for cleaning on substantially all sides without inhibiting accessibility to the surfaces to be cleaned. For example, tracks 78, 79 might also be constructed of a substantially open mesh or grating of sufficient strength to support the weight of the forks 44, 45, but which would not substantially block spray from reaching the majority of the surfaces of the forks 44, 45, mounts 37, 38 and wheels 46, 47 of a pallet jack 40,50.

One of each pair of parallel upright guides 80, 81, 82, 83 may extend across floor portion 63 to assist in the proper positioning and alignment of the front wheels 46, 47 during loading of the pallet jack 40, 50. In the embodiment shown in FIG. 4, the upright guides 80, 81, which comprise the inside edges of the parallel tracks 78, 79, may be affixed across floor portion 63 and the ramp 68 (or in an embodiment not shown, only across the floor portion 63), with the leading ends set at an expanding angle from the front to the inside edge of the parallel tracks 78, 79. The front wheel 46 or 47 of a pallet jack 40, 50 entering the ramp 68 at an angle would encounter one of the upright guides, 80, 81 and be pushed outward until achieving proper alignment of the front wheels 46, 47 for continuing onto tracks 78, 79. In an alternate embodiment illustrated from the side in FIG. 3, the upright guides 82, 83 that comprise the outside edges of the parallel tracks 78, 79 may be affixed atop the floor portion 63 at converging angles from the ramp 68 to the outside edges of the parallel tracks 78, 79 to assist in the proper positioning and alignment of the front wheels 46, 47 of the pallet jack 40, 50 onto the tracks 78, 79.

A bumper pad 88 may be affixed to the entrance end 32 of enclosure 22 about the opening 29 or horizontal slot 30 (not shown in FIG. 4) to ensure the front 52 of the housing 51 of the pallet jack 40, 50 (now shown) remains outside the enclosure 22 and thus prevent the forks 44, 45 from possibly being driven through the closed end 28 of the enclosure 22.

Figure 5:
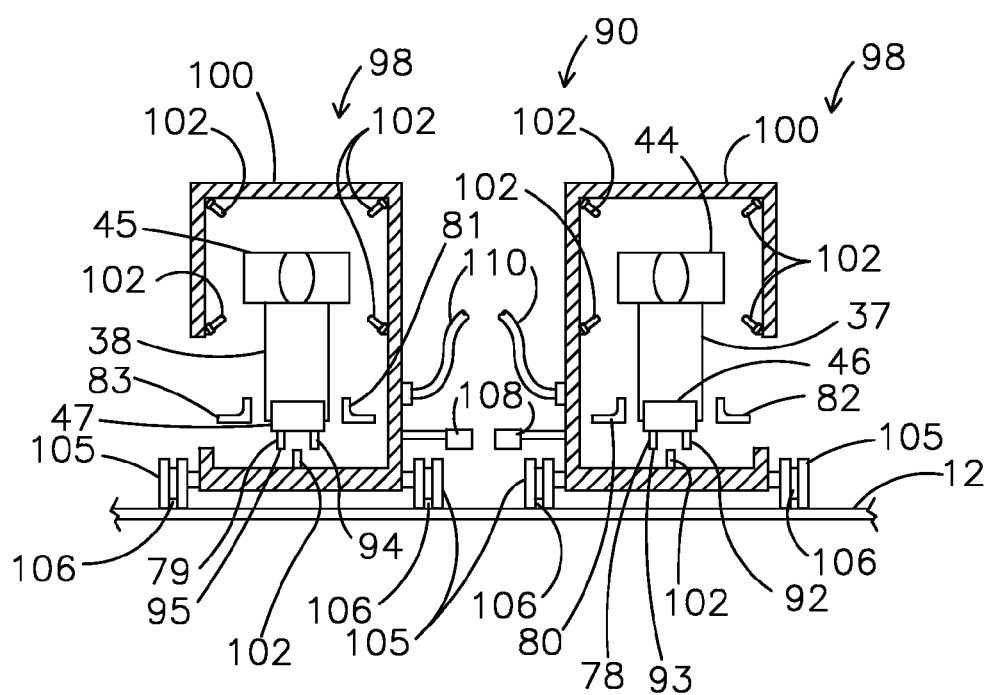
FIG. 5 is a front view of a spray housing of a preferred embodiment of the pallet jack washer apparatus of the present invention.

FIG. 5 shows a front view of the spray assembly 90 of a preferred embodiment of the pallet jack washer apparatus of the present invention. In a preferred embodiment, spray assembly 90 comprises a travelling spray housing 98, 99 about each track 78, 79 (and any pallet jack fork 44, 45 carried upon the track 78, 79). Spray assembly is configured to travel back and forth lengthwise axially along the tracks 78, 79 to apply liquids to the forks 44, 45, mounts 37, 38 and front wheels 46, 47 of a pallet jack 40, 50. Spray housings 98, 99 comprise rigid conduits 100 for liquids such as pipes, each rigid conduit 100 having and supplying liquid to a plurality of spray nozzles or spray heads 102 positioned about the tracks 78, 79 to be discharged inwardly from substantially all angles under pressure towards the tracks 78, 79 and pallet jack forks 44, 45. The spray assembly 90 is capable of delivering water through a single spray head at a rate of 0.1 gallons per minute (gpm) to 10 gpm. The pressure at which washing fluids are supplied to the spray assembly is selectively variable by means of a system of variable pressure pumps and valves.

Spray assembly 90 is carried upon a guide assembly running parallel to the tracks, such as roller guides 106. In this preferred embodiment, spray assembly 90 has two or more wheels or rollers, such as slotted rollers 105, resting upon roller guides 106 attached to base frame 11 (not shown) or the catch basin 12. Spray assembly 90 is propelled along the length of the roller guides 106 parallel to tracks 78, 79 by means for reciprocal actuation, such as a rodless air cylinder 108, hydraulic piston, chain drive (not shown), pulley (not shown), or any other typical mechanisms for moving a shuttle back and forth along a pre-determined path. Spray housings 98, 99 may travel independently or in tandem if physically connected. Other embodiments of the guide assembly, though not shown in the drawings, fall within the contemplation of the present invention. For example, spray assembly 90 could be suspended from rails above the spray assembly, rather than resting on guides 106. Likewise, one or more slotted rails carrying slidable shuttles connected to the spray assembly 90 could be used as a means for guiding the path of the spray assembly 90 along the tracks 78, 79.

One or more flexible hoses 110 are connected to the spray assembly 90, such as to each of the spray housings 98, 99 of the spray assembly 90. Flexible hoses 110 are connected by appropriate plumbing, such as a cleaning fluid circuit (shown in FIG. 7), to carry washing fluids received from one or more sources of washing fluids. Thus it can be seen that as the spray assembly 90 travels along the length of the tracks 78, 79, the desired washing fluids may be sprayed under pressure on all of the surfaces of a pallet jack fork that has been inserted into the enclosure along the tracks 78, 79. As used in this invention, the term "washing fluid" may be used to refer to any known liquid, gel, foam or liquifiable washing agent or disinfectant useful in washing contaminants from an object and sanitizing an object, including water, soaps, detergents, disinfectants, sanitizers or other suitable washing agents or combinations thereof. As shown in schematic form in FIG. 7, appropriate plumbing connections and valves may be provided to selectively channel the desired washing fluid from a source into the spray assembly 90 in an appropriate sequence for selectable periods of time and at selectable pressures to produce the desired washing and sanitizing effects. Sources may include a connection to public water system and to one or more or refillable fluid reservoirs filled with the desired washing fluids or components thereof. In the embodiment shown in FIG. 7, the cleaning fluid circuit 115 comprises a first reservoir, tank or drum 117 for holding a supply of water, a second reservoir 116 for holding a supply of detergent fluid, and a third reservoir 118 for holding a supply of sanitizer fluid. The entire cleaning fluid circuit 115 is also connected a public water supply 120. Selectively controllable valves 122 control the flow of water into which detergent or sanitizer is drawn by a partial vacuum or pumped and fed to spray heads in the spray assembly 90 within the enclosure 22. Similarly, pumps 125 and selectively controllable valves 124 control the flowrate and pressure of water or other washing fluids fed to spray heads in the spray assembly 90. Fluids discharged through the spray heads collect within the catch basin 12 and are removed for disposal or recycling from the enclosure 22.

In an alternate embodiment illustrated in FIG. 6, spray assembly 90 may comprise one or more separate, fixed dedicated headers 110, 111 within the enclosure and substantially running the length of the enclosure 22 along the tracks 78, 79, such as above the tracks 78, 79 or below or beside the tracks 78, 79 (not shown). A dedicated header 110, 111 has a plurality of spray heads along its length to which it supplies a washing fluid. Each dedicated header 110, 110 may be attached to a plurality of or only a single fluid source or reservoir (not show) and, with appropriate plumbing, is capable of selectively supplying different washing fluids or may be dedicated to supplying only a single washing fluid, such as a detergent or sanitizing agent. In an embodiment not illustrated, dedicated headers 110, 110 may also comprise one or more separately plumbed conduits on the reciprocating spray housings 98, 99 instead of a stationary header running the length of the enclosure. Including dedicated headers 110, 111 on spray housings 98, 99 would necessitate the use of additional dedicated plumbing and pumps and a flexible tube or hose to supply the selected washing fluid.

In another alternate embodiment not illustrated, spray assembly 90 may further comprise one or more undercarriage spray headers each having a plurality of spray heads running beneath the open subportion 36 of the second portion 35 (portions shown in FIG. 4). Such undercarriage spray headers would provide a means for selectively applying washing fluids under pressure to the undercarriage of a pallet jack 40, 50 that had its forks 44, 45 fully inserted into the enclosure for cleaning. In such an embodiment, the wall frames 14, 15 would preferably be fitted with panels to block spray from beneath the pallet jack during cleaning as such spraying would take place outside of the enclosure 22, yet still above the catch basin 12. Activation of such undercarriage spray headers would be plumbed to be separately activated as desired. For example, activation of undercarriage spray headers would be desirable when cleaning powered pallet jacks 50, but less desirable when cleaning manual pallet jacks 40 due to the difference in the sized of such pallet jacks 40, 50.

Figure 6:
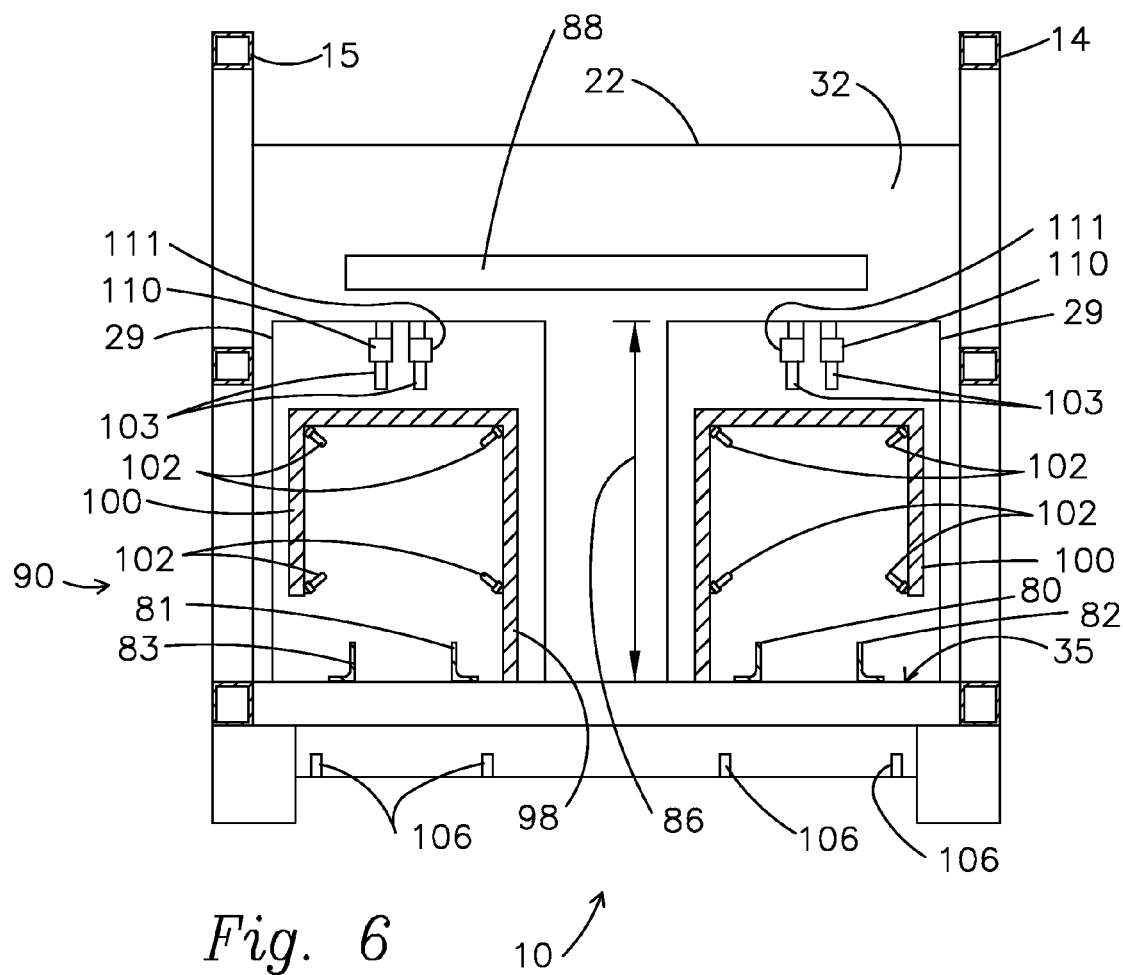
FIG. 6 is a front cross sectional view of the pallet jack washer apparatus of the present invention taken along the line A-A in FIG. 3.

As illustrated in FIG. 6, the one or more openings 29 in the entrance end 32 of the enclosure 22 must have a sufficient height 86 to allow clearance for the front end 48, 49 of the forks 44, 45 of all standard length pallet jacks 40, 50 (not shown) to enter into the enclosure 22 when the pallet jack 40, 50 is tilted upward as it moves up the ramp 68. Openings 29 may comprise a single horizontal slot (not shown) which would allow for more washing action on the front 52 of the housing 51 of a powered pallet jack 50 when the pallet jack 50 is engaged against the entrance end 32 of the enclosure 22.

The operation of the pallet jack washing apparatus 10 may be automated through the use of a variety of known programmable logic controllers or by relays, timers and push buttons. The pallet jack washing apparatus 10 includes a control panel (not shown) that houses and mounts gauges, control knobs, dials, limit switches, temperature controls, pump motor controls, solenoids, relays, timers, indicator lights and/or a programmable logic operator interface, such as a screen, keyboard and mouse. The control panel may also house electronics which provide adjustable settings for all parameters of the cleaning and sanitizing process, such as time, temperature, chemical strength, flowrate, pressure, and sanitizing strength. Automated controls and timers may be provided to start and stop the washing system, or to initiate any specific phase of the washing process, such as wash cycle, rinse cycle, and sanitization cycle, or to operate and control specific pumps and valves. Programmable logic controllers may include data logging to record and report information including time, chemical strength, temperature, flowrate, pressure, sanitizing strength, operator and pallet jack.

The pallet jack washing apparatus 10 may also equipped with sensors, timers, and safety switches to increase usefulness and efficiency. The pallet jack washing apparatus may include sensors for determining the size of the forks 44, 45 of the pallet jack being washed, sensors to indicate the full insertion of the forks 44, 45 into the enclosure 22, sensors indicating that the cover 74 is open or closed, sensors indicating the availability, preparation, readiness, temperature, amount or current level of washing fluids, sensors indicating the status of different components or systems of the pallet jack washing apparatus 10 or the spray apparatus, such as pumps, valves, and pressure gauges, and timers to control sequencing of events.

In the preferred embodiment, for safety and to prevent the possible spread of contaminates, the pallet jack washing apparatus will only function when the enclosure is completely enclosed. In such an embodiment, the cover members 74 would include a cut-off switch (not shown) that will prevent or stop operation of the system when a cover 74 is open or unlatched. Similarly, a sensor may be programmed to prevent the initiation of the washing process if one or more of the washing agent reservoirs are empty or if appropriate chemicals are not ready. Other sensors may prevent or shut down operation if the pallet jack 40, 50 is detected to not be in the proper position on the tracks 78, 79.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. An apparatus for washing the forks of a pallet jack comprising:
    (a) an enclosure having an entrance end, the entrance end having one or more openings;
    (b) a bumper pad affixed to the entrance end of the enclosure about one or more openings;
    (c) a substantially open track traversing within the enclosure from said opening;
    (d) a spray assembly about the track having a plurality of spray heads for directing washing fluid towards the track from substantially all angles;
    (e) a plurality of selectively controllable valves connected to the spray heads in the spray assembly;
    (f) a cleaning fluid circuit connected to the spray assembly for selectively supplying washing fluid under variable pressure to the spray assembly;
    (g) wherein the cleaning fluid circuit comprises a first reservoir for holding a supply of water, a second reservoir for holding a supply of detergent fluid, and a third reservoir for holding a supply of sanitizer fluid.

2. The apparatus of claim 1 wherein the spray assembly travels along a guide assembly running parallel to the track.

3. The apparatus of claim 1 wherein the substantially open track further comprises a pair of parallel tracks.

4. The apparatus of claim 3 wherein each parallel track comprises a pair of relatively thin runners and one or more upright guides.

5. The apparatus of claim 4 wherein the spray assembly further comprises a first spray housing about a first of the parallel tracks, and a second spray housing about a second of the parallel tracks.

6. The apparatus of claim 2 further comprising means for reciprocal actuation of the spray assembly along the guide assembly.

7. The apparatus of claim 5 further comprising means for reciprocal actuation of the first spray housing along the first parallel track and a means for reciprocal actuation of the second spray housing along the second parallel track.

8. The apparatus of claim 1 further comprising:
    (a) an elevated base frame having first and second opposing ends, the enclosure being carried upon a first portion of the base frame;
    (b) the enclosure further comprising a catch basin;
    (c) the entrance end of the enclosure being disposed across the base frame between the first and second opposing ends;
    (d) a second portion of the base frame outside of the enclosure and carrying a floor portion; and (e) a ramp attached to said second portion of the base frame.

9. The apparatus of claim 8 wherein the substantially open track is attached to the floor portion.

10. The apparatus of claim 1 further comprising a programmable logic controller for controlling operation of the apparatus.

11. The apparatus of claim 1 wherein the spray assembly further comprises one or more fixed headers within the enclosure and running along and about the track.

12. The apparatus of claim 8 wherein:
(a) the floor portion is sized to leave a subportion of the second portion of the base frame open and uncovered between an inner edge of the floor portion and the entrance end of the enclosure;
(b) wherein the catch basin extends beyond the entrance end of the enclosure and runs underneath the subportion of the second portion of the base frame; and
(c) wherein the spray assembly further comprises one or more undercarriage spray headers outside of the enclosure running beneath the subportion of the second portion, the undercarriage spray header having a plurality of spray heads.

13. An apparatus for washing the forks of a pallet jack comprising:
(a) an enclosure having an entrance end, the entrance end having one or more openings;
(b) a bumper pad affixed to the entrance end of the enclosure about one or more openings;
(c) a substantially open track comprising a pair of parallel tracks, wherein such parallel track further comprises relatively thin runners and one or more upright guides;
(d) a spray assembly about the track having a plurality of spray heads for directing washing fluid towards the track from substantially all angles;
(e) a cleaning fluid circuit connected to the spray assembly for selectively supplying washing fluid under variable pressure to the spray assembly;
(f) wherein the cleaning fluid circuit comprises a first reservoir for holding a supply of water, a second reservoir for holding a supply of detergent fluid, and a third reservoir for holding a supply of sanitizer fluid.

14. The apparatus of claim 13 further comprising a programmable logic controller for controlling operation of the apparatus.

15. The apparatus of claim 13 wherein the spray assembly travels along a guide assembly running parallel to the track.

16. The apparatus of claim 15 further comprising means for reciprocal actuation of the spray assembly along the guide assembly.

17. An apparatus for washing the forks of a pallet jack comprising:
(a) an enclosure comprising a catch basin having an entrance end, the entrance end having one or more openings;
(b) a bumper pad affixed to the entrance end of the enclosure about one or more openings;
(c) a substantially open track traversing within the enclosure from said opening;
(d) a spray assembly about the track having a plurality of spray heads for directing washing fluid towards the track from substantially all angles;
(e) a plurality of selectively controllable valves connected to the spray heads in the spray assembly;
(f) a cleaning fluid circuit connected to the spray assembly for selectively supplying washing fluid under variable pressure to the spray assembly;
(g) wherein the cleaning fluid circuit comprises a first reservoir for holding a supply of water, a second reservoir for holding a supply of detergent fluid, and a third reservoir for holding a supply of sanitizer fluid;
(h) an elevated base frame having first and second opposing ends, the enclosure being carried upon a first portion of the base frame;
(i) a second portion of the base frame outside of the enclosure and carrying a floor portion;
(j) the entrance end of the enclosure being disposed across the base frame between the first and second opposing ends; and
(k) a ramp attached to said second portion of the base frame.

18. The apparatus of claim 17 further comprising a programmable logic controller for controlling operation of the apparatus.

19. The apparatus of claim 17 wherein the spray assembly travels along a guide assembly running parallel to the track.

20. The apparatus of claim 19 further comprising means for reciprocal actuation of the spray assembly along the guide assembly.

* * * * *